United States Patent [19]

Smith

[11] Patent Number: 5,408,238
[45] Date of Patent: Apr. 18, 1995

[54] LOCATION OF OVERBOARD PERSON OR OBJECT OR OF WATER-CHEMICAL INTERFACE

[75] Inventor: Terry J. Smith, Campbell, Calif.

[73] Assignee: Trimble Navigation Ltd., Sunnyvale, Calif.

[21] Appl. No.: 32,301

[22] Filed: Mar. 17, 1993

[51] Int. Cl.$^6$ .......................... H04B 7/185; G01S 5/02
[52] U.S. Cl. ........................................ 342/357; 441/80
[58] Field of Search ...................... 342/357; 441/80, 89

[56] References Cited

U.S. PATENT DOCUMENTS

| | | |
|---|---|---|
| 3,686,656 | 8/1971 | Richards . |
| 3,810,146 | 5/1974 | Lieb . |
| 3,886,612 | 6/1975 | Schnirel et al. . |
| 4,079,364 | 3/1978 | Anentore . |
| 4,305,143 | 12/1981 | Simms et al. . |
| 4,343,056 | 8/1982 | McDonald . |
| 4,599,073 | 7/1986 | Fryer et al. . |
| 4,599,074 | 7/1986 | Beckly . |
| 4,622,557 | 11/1986 | Westerfield ........................... 342/357 |
| 4,630,205 | 12/1986 | Otaka . |
| 4,702,715 | 10/1987 | Winick ..................... 441/80 |
| 4,714,914 | 12/1987 | Boe . |
| 4,747,797 | 5/1988 | Hindle . |
| 4,813,025 | 3/1989 | Rowland et al. . |
| 4,819,053 | 4/1989 | Halavais .............................. 342/353 |
| 4,843,994 | 7/1989 | Wilson et al. . |
| 4,949,089 | 8/1990 | Ruszkowski . |
| 5,006,831 | 4/1991 | de Solminhac . |
| 5,148,002 | 9/1992 | Kuo et al. ............................ 219/211 |
| 5,148,412 | 9/1992 | Suggs .................................. 367/131 |
| 5,153,836 | 10/1992 | Fraughton et al. ................. 364/461 |
| 5,193,215 | 3/1993 | Olmer .................................. 455/66 |
| 5,202,829 | 4/1993 | Geier ................................... 364/449 |
| 5,208,465 | 5/1993 | Jacobson ............................. 250/573 |

OTHER PUBLICATIONS

B. Stetson, "When a crewmember falls overboard", Sail, Feb. 1993, pp. 48–54.

Primary Examiner—Theodore M. Blum
Attorney, Agent, or Firm—John Schipper

[57] ABSTRACT

Apparatus for determining and broadcasting the approximate location of a person or other object that has fallen overboard from a boat or other structure into a body of water. The apparatus includes a floatable object that is thrown into the water near the overboard person/object to broadcast the location of the object and the nearby overboard person. The floatable object includes: an activatable Satellite Positioning System (SPS) receiver/processor and antenna to receive SPS signals from two or more SPS satellites; an activatable location transmitter and transmitter interface to receive the SPS-determined location information from the SPS receiver/processor; a power supply to supply power to the SPS receiver/processor and the location transmitter; and activation means to activate the SPS receiver/processor and location transmitter. The floatable object may be attached to or include a drogue, unfurled in the water, to encourage the floatable object to move with the same velocity and in the same direction as the local water current. In another embodiment, the apparatus may include a chemical analyzer, positioned to be in contact with the ambient liquid, to analyze the local concentration of a target chemical in this liquid and to cause this concentration value to be broadcast. This embodiment is useful for monitoring the present location and/or rate of movement of the boundary between the ambient water and a chemical (such as oil) intentionally or unintentionally released into the water. The SPS receiver/processor and location transmitter can be activated by a water immersion switch, by a manually operable switch, by transmission of an activation signal from a nearby structure, such as a boat, or by any other suitable action. The SPS may be a Global Positioning System (GPS), a Global Orbital Navigational System (GLONASS), or any other suitable satellite-based location and navigation system.

17 Claims, 5 Drawing Sheets

LOCATION OF OVERBOARD PERSON OR OBJECT OR OF WATER-CHEMICAL INTERFACE

FIELD OF THE INVENTION

This invention relates to marine safety equipment, and more particularly to communication of the location of a person or other object that has fallen overboard, or the location of objects or of boundaries of abnormal substances in the water, using location information provided by satellites.

BACKGROUND OF THE INVENTION

Persons travelling on a boat across a body of water are exposed to the possibility of falling overboard, and of drowning, in part because of confusion or an inability to determine the present location of the overboard person. If the boat from which the person falls overboard is a small keel boat, the boat master may be able to turn the craft around within a radius of 3-10 boat lengths after first becoming aware of the mishap; in a large keel boat, the distance required to turn is much larger because of the greater inertia of the large keel boat. The upper surface of a large body of water, such as a river, lake, sea or ocean, is seldom flat and often manifests a sequence of peaks and troughs ("swells") that serve to hide the exposed or above-water portion of the overboard person in the water. A large body of water is often perturbed by surface current that can carry a person or object in the water in an arbitrary direction at a rate greater than 3 feet per second. In such an instance, knowledge of the point of entry into the water of the overboard person is of little help in locating the person five minutes after the overboard incident. Thus, it is often crucial to determine the present location of the overboard person so that a boat or other watercraft can quickly return to that location and search for and retrieve the overboard person. Several workers in this field have developed approaches to (1) advise the boat's occupants of the overboard incident or (2) indicate the location where the overboard incident occurred or (3) assist in retrieval of the overboard person, once that person is located.

Sunken vessel locator apparatus that operates only if the vessel is submerged is disclosed in U.S. Pat. No. 3,686,656, issued to Richards. The apparatus includes a water-responsive switch and alarm with a water-tight battery is attached to the vessel and generates a distinctive sound underwater when the switch senses that it has become submerged. The distinctive sound might be used to determine the direction from which, but not the location of, the alarm that produces the sound.

Lieb discloses an alarm system, including a portable transmitter attached to the body of a person to be monitored, that is activated upon its immersion in water, in U.S. Pat. No. 3,810,146. The transmitter issues a distinctive signal that is sensed by a nearby receiver that activates an alarm to indicate that the monitored person (for example, a non-swimmer) is immersed in water. The transmitter switch is activated by electrical bridging of two electrodes through immersion of the volume between the electrodes in water or another liquid with relatively high electrical conductivity. The alarm system does not indicate the location of the monitored person in the water.

An alarm system that operates in a similar manner to that of Lieb is disclosed by Antenore in U.S. Pat. No. 4,079,364. The alarm system is automatically released from the wearer's body upon immersion in water and floats on the top surface of the water. The alarm is received above the water.

A Man Overboard Package, allegedly arranged to provide lifesaving apparatus for a person who has fallen overboard into water from a boat, is disclosed in U.S. Pat. No. 3,886,612, issued to Schnirel et al. The Package includes a rocket and rocket launcher that carries the remainder of the apparatus (inflatable life rings, etc.) to a position adjacent to the overboard person in the water. The Package provides no means of locating the overboard person, except for a line of length at most 600 feet that is dropped between the boat and the overboard person by the rocket and launcher.

U.S. Pat. No. 4,305,143, issued to Simms et al, discloses a Man Overboard sensor and rescue system. Part of the apparatus is worn on a person's clothing and is activated by immersion in water. This part of the apparatus, when activated, emits ultrasonic waves that are carried underwater to and sensed by a receiver carried on a boat. This receiver than activates an audible alarm or visual display, indicating that a person has fallen overboard, and may also cause flotation equipment and a marker buoy to be discharged from the boat. The marker buoy may or may not be adjacent to the person overboard, and the buoy's location would have to be found by line of sight visual searching.

Man Overboard rescue apparatus for use on a sailboat is disclosed by McDonald in U.S. Pat. No. 4,343,056. After a person has fallen overboard and been located, a lifeline and attached life ring is tossed to that person, and the person is pulled to the boat by a boom structure attached to a mast on the sailboat. A similar invention, disclosed in U.S. Pat. No. 4,599,073 by Fryer et al, uses a flotation sling to lift the overboard person into the boat. Beckly, in U.S. Pat. No. 4,599,074, discloses a Man Overboard retrieval device including a boom attached to the bow or other exposed portion of a boat, to be used to reel an overboard person into the boat. U.S. Pat. No. 4,747,797, issued to Hindle, discloses Man Overboard retrieval apparatus including an inflatable ring or small boat, part of which converts to a sling to haul the overboard person out of the water and into the boat. Wilson et al, in U.S. Pat. No. 4,843,994, disclose use of a specially configured boat fender as an auxiliary float, to be thrown to a person who has fallen overboard from a boat. None of these apparati provides a means for locating the overboard person so that a boat can move to that location.

Otaka discloses a system for automatically stopping a boat when the sole crewperson on the boat falls overboard, in U.S. Pat. No. 4,630,205. The (sole) crewperson wears a radio transmitter that transmits a signal continuously at a certain intensity when that person is aboard the boat. The transmitted signal is attenuated or stops altogether when the crewperson falls overboard, and the resulting absence of signal causes the boat to stop. In another embodiment, the on-board system computes the accumulated time since the crewperson fell overboard and causes the boat to maneuver to return to the approximate location where this overboard incident occurred. The radio transmitter worn by the crewperson can transmit a rescue signal when the overboard incident occurs, but this signal contains no information on the location of the crewperson or the transmitter.

A liquid immersion switch that is activated when the switch wearer falls overboard from a boat is disclosed by Boe in U.S. Pat. No. 4,714,914. An alarm delay circuit is built in so that momentary or transitory immersion of the switch in water or another liquid will not activate the switch. The alarm signal carries no information on the location of the person overboard.

Rowland et al, in U.S. Pat. No. 4,813,025, discloses a person location and water safety system in which each person on board a boat wears a transceiver. A central station interrogates each transceiver in a fixed sequence, using both radio waves and ultrasonic waves, and each transceiver responds by a signal that is distinctive for that transceiver. The "round trip time" for the interrogation signal and response signal indicates the distance of the person wearing that transceiver from the central station. If the wearer falls overboard, the transceiver responds with a radio wave or an ultrasonic wave, according as the transceiver is above the water or submerged in water; and the central station senses and distinguishes between arrival of these two kinds of response signals. The central station uses an angie discrimination antenna to determine the direction from which the response signal arrives and uses the signal round trip time to determine approximately the location of the transceiver, and thus of the wearer. This system appears to require line of sight communication, above the water line or below the water line, between the central station and an individual transceiver. The Rowland et al patent also discusses several earlier patents that disclose water immersion alarm systems for boating safety, none of which provides adequate information on location of the alarm or the wearer in the water.

A portable military target locator using a Global Positioning System (GPS) is disclosed by Ruszkowski in U.S. Pat. No. 4,949,089. A rifle-laser rangefinder located at a known GPS position on the ground is used to determine the present location of a moving target, such as a tank on the ground, relative to the rangefinder. This information, together GPS-determined information on the rangefinder's location, is transmitted to another vehicle, such as an aircraft on a search-and-destroy mission. The rangefinder apparatus must remain at a known, fixed position and relies upon line-of-sight contact with the target.

U.S. Pat. No. 5,006,831, issued to de Solminihac, discloses positioning of an acoustic signal transmitter on the underside of a boat, for use in a Man Overboard situation. A boat occupant wears an alarm pack including an acoustic sensor. If the boat occupant falls overboard, the alarm pack receives the acoustic signal and causes, by remote control, the boat to jettison a beacon with its own signal into the water, to mark the approximate position of the person who has fallen overboard. The beacon may enter and reside in the water at some distance from the person in the water, and the beacon provides only line of sight visual information on this person's approximate location.

Stetson, in "When a crewmember falls overboard", Sail, Feb. 1993, pp. 48-54, discusses how a boat should attempt to return to the location where a crewmember has just fallen overboard, using a jib or tacking and gybing to execute a sequence of 12 steps to bring .the boat back to that location. Although a small keel boat may be able to turn and return in 3-10 boat lengths, a big keel boat typically will require much more room, and the line of sight to the overboard crewmember may be lost for some time interval. A method, other than line-of-sight contact, for keeping track of the overboard crewmember's present location in the water is not discussed.

What is needed is an approach: (1) that can instantly advise the boat's occupants that an overboard incident has occurred; (2) that can continually advise the boat's occupants of the approximate present location of the overboard person; (3) that does not require line-of-sight contact and constant vigilance in order to maintain such contact; (4) that does not require expenditure of great amounts of resources, such as electrical power, to obtain information on the present location of the person overboard; and (5) that is relatively compact and can be easily carried by a boat occupant or on a boat; (6) that can be used for measuring or indicating the location and/or rate of movement of a boundary between two dissimilar liquids, such as oil and water, on the surface of a body of water; (7) that can be used for real time studies of ocean currents, tides, or movement of other bodies of water, such as rivers; (8) that can be used to mark the present location of fishing nets that are set out on an ocean or sea and returned to at a later time; and (9) that can be extended to search-and-retrieval for overboard persons or objects using aircraft or other vessels.

SUMMARY OF THE INVENTION

These needs are met by the invention, which provides a floatable object, such as a Man Overboard Pole ("MOP") or similar apparatus, that is thrown into the water near the overboard person and that continually advises the boat's occupants of the present location of the MOP and overboard person by radio waves that do not require line-of-sight contact. The boat, or any other nearby watercraft or other structure that can respond to the incident, receives this radiowave signal on a selected channel and can return to the indicated present location of the MOP and overboard person by matching its present location with the indicated present location of the MOP. If a water current carries the overboard person away from that person's entry point into the water, the MOP will follow the same course, even if the overboard person has not reached out to grasp the MOP.

The invention combines an activatable Satellite Positioning System (SPS) signal antenna and receiver/processor and an activatable radio transmitter with a MOP so that the location of the MOP, and thus of the overboard person, can be determined without requiring sighting of a visually perceptible signal, such as a flag or a strobed light. The SPS receiver/processor and radio transmitter on the MOP would be activated before or at the time the MOP is thrown overboard to mark the approximate location where the overboard person entered the water. The boat carries a second activatable SPS signal antenna and receiver/processor and an activatable radio receiver that is tuned to the frequency band on which the radio transmitter will broadcast.

When a person falls overboard, the SPS receiver/processor and radio transmitter on the MOP are activated as the MOP is thrown overboard. Thus, electrical power is not drawn by the apparatus until the apparatus is activated for use in an overboard incident. The SPS signal receiver/processor determines the location of the SPS antenna, this location information is passed through a transmitter interface to the transmitter, and the transmitter begins to broadcast a distress signal giving the coordinates of this location. At this time, if not before, the SPS receiver/processor and radio receiver on board the boat or another nearby watercraft are activated, and the radio receiver begins to receive and display or store the SPS-determined location coordinates of the MOP. The SPS-determined location coordinates of the SPS antenna on board the boat are also found and compared with the location coordinates of the MOP broadcast by the transmitter. The boat can thus promptly return to the locale of the MOP and search for the person who has fallen overboard, without requiring line-of-sight contact and without assuming that the overboard person and the MOP have remained motionless in the water.

Activation of the SPS receiver/processor and location transmitter on the MOP can be implemented by (1) a water immersion switch on the MOP, (2) a manually operable switch on the MOP, (3) a radiowave activation signal of a selected frequency that is transmitted from the boat or another nearby structure, or (4) any other suitable activation instrument.

To facilitate location of the MOP itself in this locale, the MOP can optionally include a visually perceptible flag and/or strobing light. Any other boat in the vicinity of the locale where the person has fallen overboard can also participate in the search, if this second boat carries a radio receiver that receives the distress signal and the SPS-determined location coordinates of the MOP. The MOP can also serve as a flotation device for the person who has fallen overboard.

DETAILED DESCRIPTION OF THE INVENTION

Figure 1:
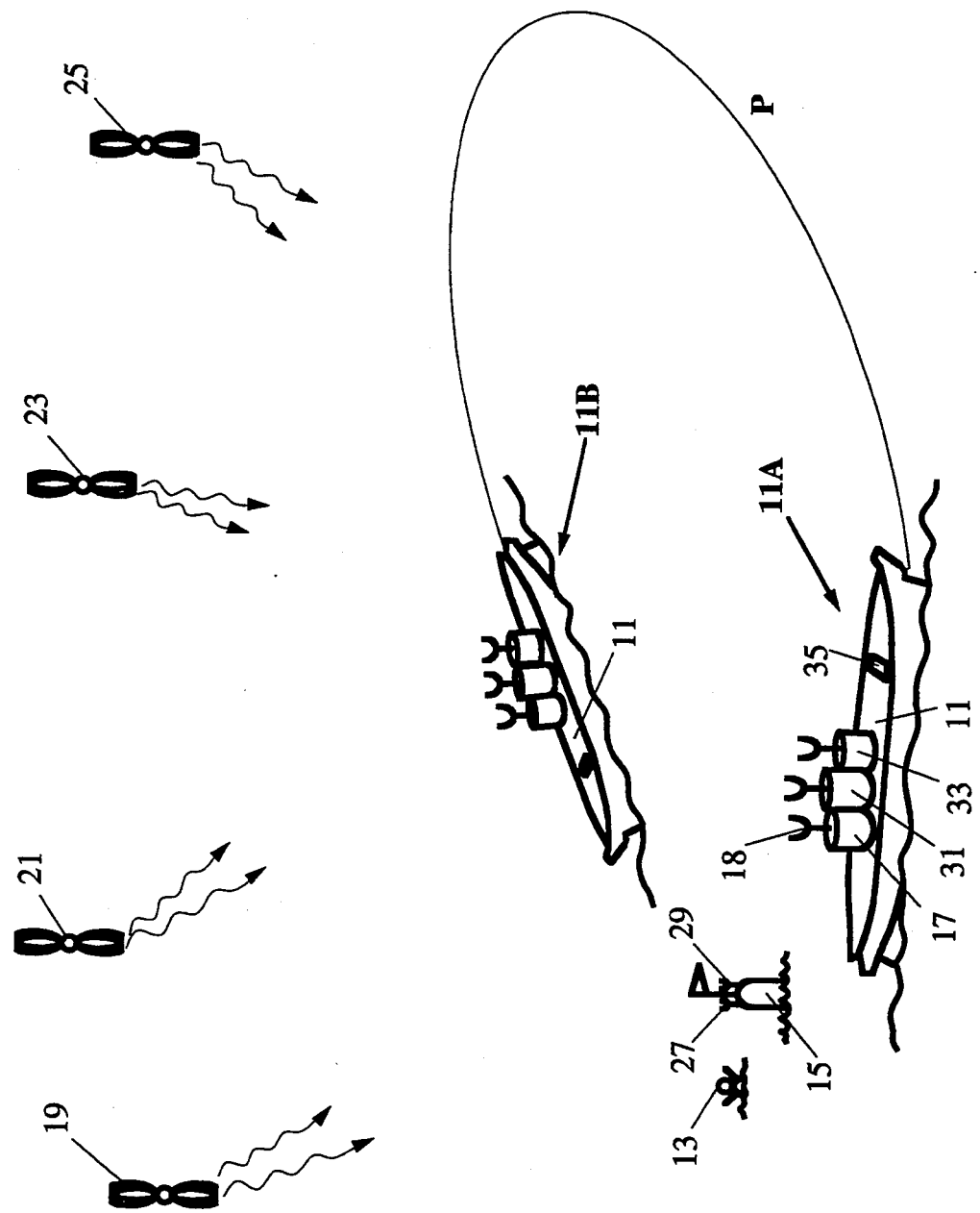
FIG. 1 is an illustration of one use of the invention.

FIG. 1 illustrates one use of the invention to locate an overboard person or other object. An occupant of a boat 11 that is in a position 11A observes that a person or object 13 (the "overboard person or object") has fallen into the water. One of the boat occupants obtains and throws into the water, near the overboard person or object, a Man Overboard Pole ("MOP"), whose structure is shown in more detail in FIG. 3. The boat 11 carries a Satellite Positioning System ("SPS") signal antenna and receiver/processor 17 that receives SPS signals from two or more SPS satellites 19, 21, 23 and 25 that have an approximate line-of-sight contact with the boat 11 and with the MOP 15. The MOP 15 also carries an SPS signal antenna 27 and receiver/processor (not shown in FIG. 1 ). The SPS may be the Global Positioning System ("GPS") or the Global Orbital Navigation System ("GLONASS"), both of which are discussed below, or any other suitable satellite-based location determination system.

Figure 3:
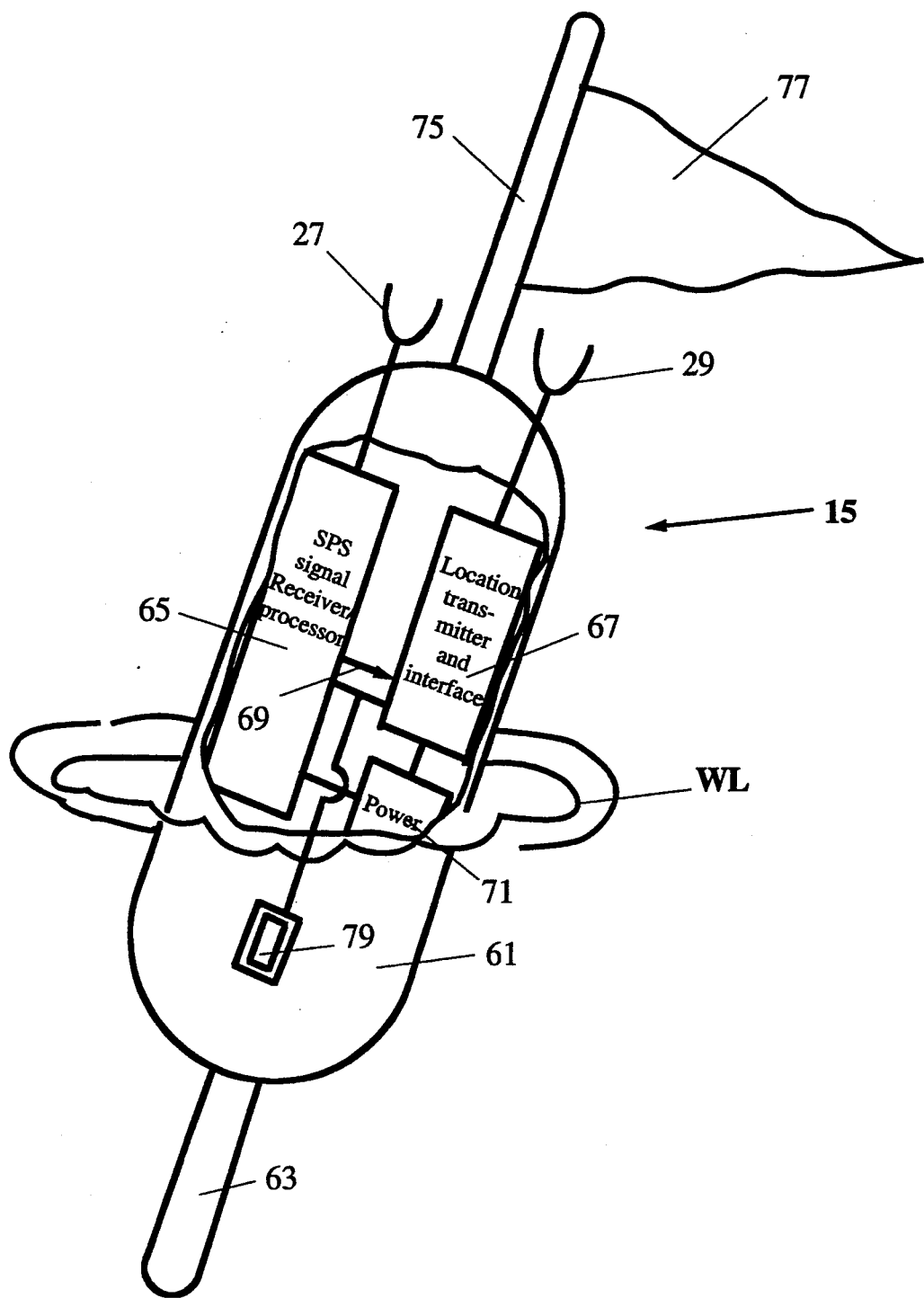
FIGS. 3 and 6 are schematic cutaway views of apparatus constructed according to two embodiments of the invention.

The MOP 15 also carries a second antenna 29 connected to a location transmitter (not shown in FIG. 1) that receives and transmits SPS-determined location signals from the SPS receiver/processor on the MOP 15. The SPS receiver/processor and the location transmitter on the MOP 15 are activated before the MOP is thrown into the water, using a manually operable switch that is shown in FIG. 3. Alternatively, these MOP instruments can be activated by transmission from the boat 11 of an activation signal from an activation transmitter and antenna 31, which activation signal is received by the antenna 29 (or another antenna on the MOP 15) and activates the SPS receiver/processor and location transmitter on the MOP 15. As a second alternative, the SPS receiver/processor and location transmitter on the MOP 15 can be activated by a water immersion switch that is positioned below the MOP water line when the MOP floats in the water.

After the SPS receiver/processor and location transmitter on the MOP 15 become activated, this receiver/processor begins receiving and processing SPS signals through its antenna 27. This SPS receiver/processor passes signals representing the location of the auached SPS antenna to the location transmitter, which trammits these signals using its antenna 29 and a selected frequency band. A receiver 33 on the boat 11 receives the SPS-determined location signals for the SPS antenna 27 and passes these signals to the SPS receiver/processor 17 on the boat 11. The SPS receiver/processor 17 receives SPS signals from the SPS satellites 19, 21, 23 and/or 25 through its own antenna 18 and determines the position of the SPS signal antenna 18. The SPS receiver/processor 17 compares the positions of the SPS signal antennas 18 and the SPS signal antenna 27 and determines the present location of the MOP 15 relative to the present location of the boat 11. The boat 11 is then caused to follow a path P that will prompfiy return the boat to a position 11B close to the MOP 15 and close to the overboard person or object 13. If local currents carry the overboard person or object 13 in a certain direction after initial entry into the water, the MOP 15 will be carried in the same direction and at approximately the same speed. Alternatively, an overboard person 13 might reach out and grasp the MOP 15 so that the overboard person and the MOP are together in the water. When the boat 11 has moved to the present location of the overboard person or object 13, that person or object can be retrieved.

The SPS receiver/processor 33 on the boat 11 can use a comparison of absolute SPS-determined locations of the SPS antennas 27 and 18 to determine the relative locations of the boat and MOP 15. Altematively, the SPS receiver/processor 33 can use SPS differential positioning to determine these relative locations. Techniques for GPS differential positioning are discussed by Allison in U.S. Pat. No. 5,144,179 and by Hatch in U.S. Pat. No. 4,812,991, both of which are incorporated by reference herein. Optionally, the SPS receiver/processor 33 can be connected to a visual display 35 on the boat 11 that indicates graphically the present location of the MOP relative to the boat.

Figure 2:
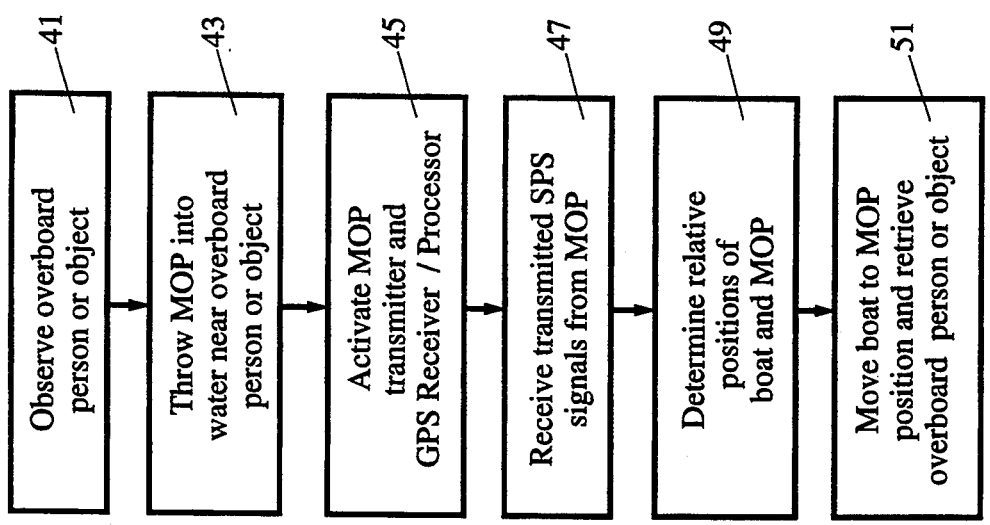
FIG. 2 is a flow chart illustrating one procedure for location and retrieval of an overboard person or other object in the water according to the invention.

FIG. 2 illustrates a suitable procedure for use of the MOP when an overboard person or object is seen in the water. In step 41, the overboard person or object is observed in the water. In steps 43 and 45, the MOP is thrown into the water, and the SPS receiver/processor and location transmitter on the MOP are activated; these two steps may occur in either order. In step 47, the SPS signals are received from the MOP location transmitter by a receiver on the boat. In step 49, the relative locations of the boat and MOP are determined from an analysis of the SPS-determined locations of the two SPS antennas 27 and 18. In step 51, the boat is moved to the present location of the MOP, and the overboard person or object is retrieved.

FIG. 3 is a schematic cutaway view of the interior of the MOP 15, showing the instruments used in one embodiment of the invention. The MOP includes a body 61 that is floatable on the water in an approximately upright position through use of a heavy weight 63 (steel, lead or another high density material) at one end of the body 61. The body 61 includes in its interior an SPS signal receiver/processor 65 connected to the SPS signal antenna 27. The interior of the body 61 further includes a location transmitter and interface 67 that is connected to and receives SPS location signals from the SPS receiver/processor 65 through one or more communication lines 69. The location transmiuer 67 is connected to the location signal antenna 29 and will broadcast the SPS location signals received from the SPS receiver/processor 65, when these MOP instruments are activated. The SPS receiver/processor 65 and the location transmitter 67 are connected to a power supply 71 (or to separate power supplies, if desired).

The SPS receiver/processor 65 and location transmitter 67 are activated by a manually operable switch 79 or by a water immersion switch (also shown as 79) positioned in the floatable body 61, preferably below the water line WL of the MOP 15. Alternatively, as discussed above, the SPS receiver/processor 65 and location transmitter 67 may be activated by a radiowave signal sent from the boat 11 (FIG. 1 ) or from some other nearby structure. Activation of the SPS receiver/processor 65 and location transmitter 67 at the time an overboard incident occurs conserves the electrical current available from the power supply 71 and allows the MOP 15 to continue to transmit its present SPS-determined location for a reasonable time interval, up to several hours, after the overboard incident occurs. The SPS receiver/processor 65 and/or the location transmitter 67 can be placed in a "sleep" mode until the MOP 15 receives the activation signal. Alternatively, the SPS antenna 27 and receiver/processor 65 can be turned partly on and be tracking the visible SPS satellites whenever the boat is in motion so that the MOP 15 is immediately ready to receive, process and transmit signals indicating the present location of the MOP.

After the instruments on the MOP are activated, the SPS receiver/processor 65 begins to receive and analyze the SPS signals from the SPS satellites 19, 21, 23 and/or 25 (FIG. 1), and the location transmitter 67 begins to broadcast this SPS location information on a selected frequency band, such as 415–495 kHz or 12.23–13.2 MHz. The SPS location signals broadcast by the location transmitter 67 are received and analyzed and/or compared with the SPS-determined location of the SPS antenna 18 on the boat 11, as discussed above.

Optionally, the MOP 15 can include a staff or rod 75 protruding from the upper end of the floatable body 61, the staff having a flag or other visually MOP in the water. Optionally, the MOP 15 can include a drogue or waterfilled cone 80 that is attached to the floatable body 61 and is unfurled in the water, to act as a drag so that the MOP does not move appreciably faster or slower, or in a different direction, than the local water currents. Use of a drogue 80 helps suppress the tendency of the floatable body 61 to move with the local wind speed and helps insure that the floatable body moves approximately at the same velocity and in the same direction as any other object in the water near the body 61.

Figure 5:
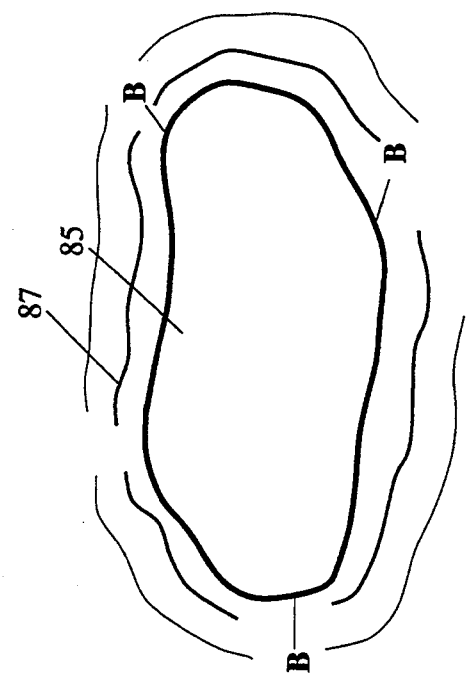
FIGS. 4 and 5 are illustrations of other uses of the invention.
Figure 4:
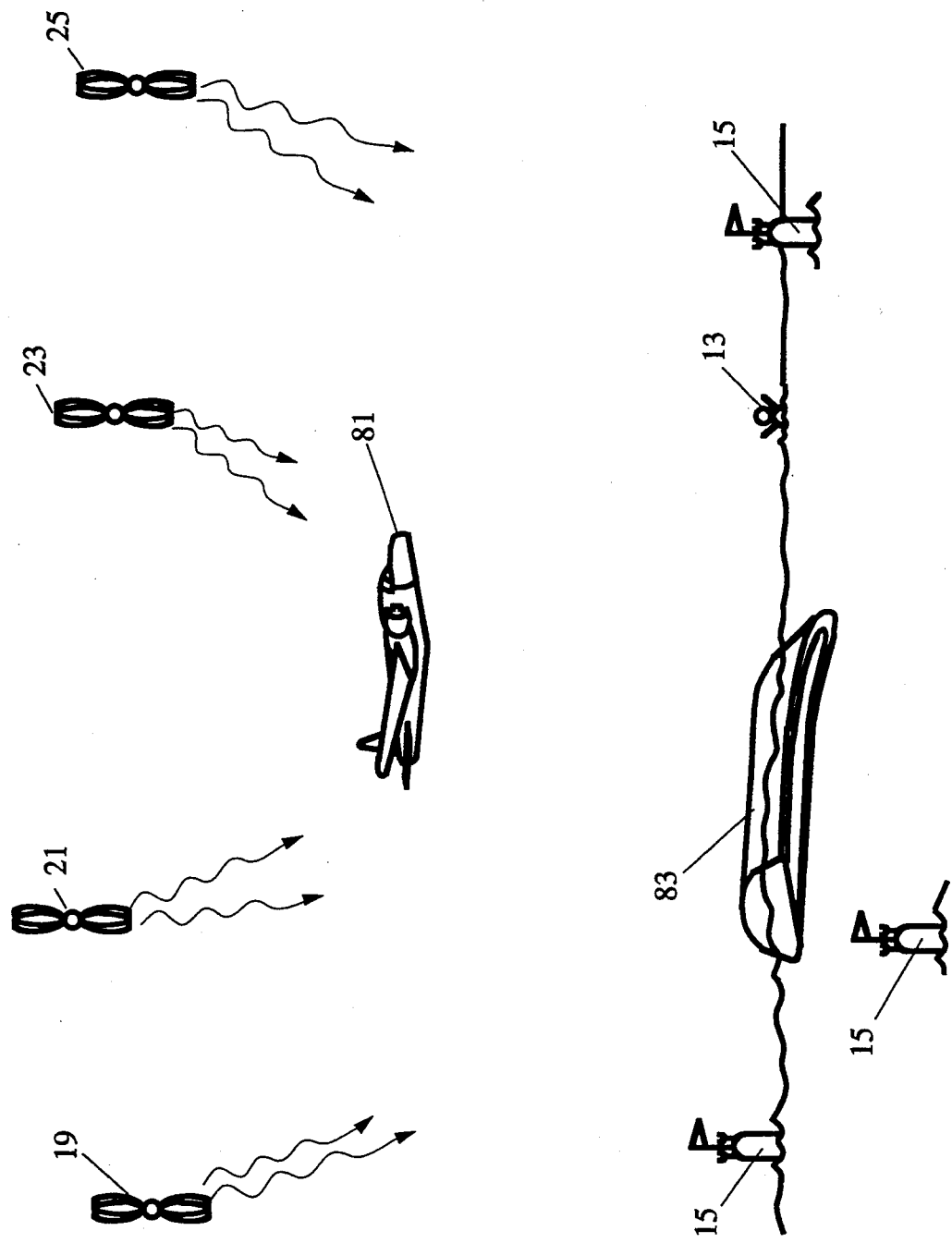

The MOP 15 shown in FIG. 3 is intended to move with the prevailing local water current and can be used for other situations as well. In a search-and-retrieval mission at sea, using an aircraft 81 (FIG. 4) to cover a large area in a short amount of time, the aircraft occupants may sight a disabled vessel and/or overboard person(s) but may be unable to land on the water and assist further in the retrieval operations. However, one or more MOPs 15 can be activated and dropped in a suitable pattern adjacent to the disabled vessel 83 and/or overboard person(s) 13, as illustrated in FIG. 4, and one or more water-borne vessels can then be dispatched to the general area where the MOPs were initially deposited. When the water-borne vessel reaches this general area, receipt of the radiowave signals from the location transmitter 67 on the MOP 15 can be used to guide the rescue party more directly to the disabled vessel and/or overboard person(s). The MOP 15, the disables vessel and the overboard person(s) should all move with approximately the same velocity vector as a result of local water currents.

Where a chemical spill 85, such as an oil spill from a large oil tanker as illustrated in FIG. 5, occurs, it is often of interest to indicate the present location of the boundary B separating this chemical from the ambient liquid 87 (usually sea water) on the exposed surface of the liquids. A plurality of MOPs 15 can be deposited in a pattern indicating the boundary B at the time of deposit. These MOPs 15 should move approximately with the boundary B and thus should allow a reasonable estimate of the present location and rate of movement of the boundary B at a later time. In this situation, the location transmitter on each MOP 15 would use a different frequency, different modulation or other distinguishing indicia. The radio signals, representing MOP location, received from each MOP can then be received and distinguished, and the present location and/or rate of movement of the boundary B can be determined and displayed visually for purposes of spill monitoring. The receiver R for these radio signals need not even have fine-of-sight contact with the area of the spill itself.

Figure 6:
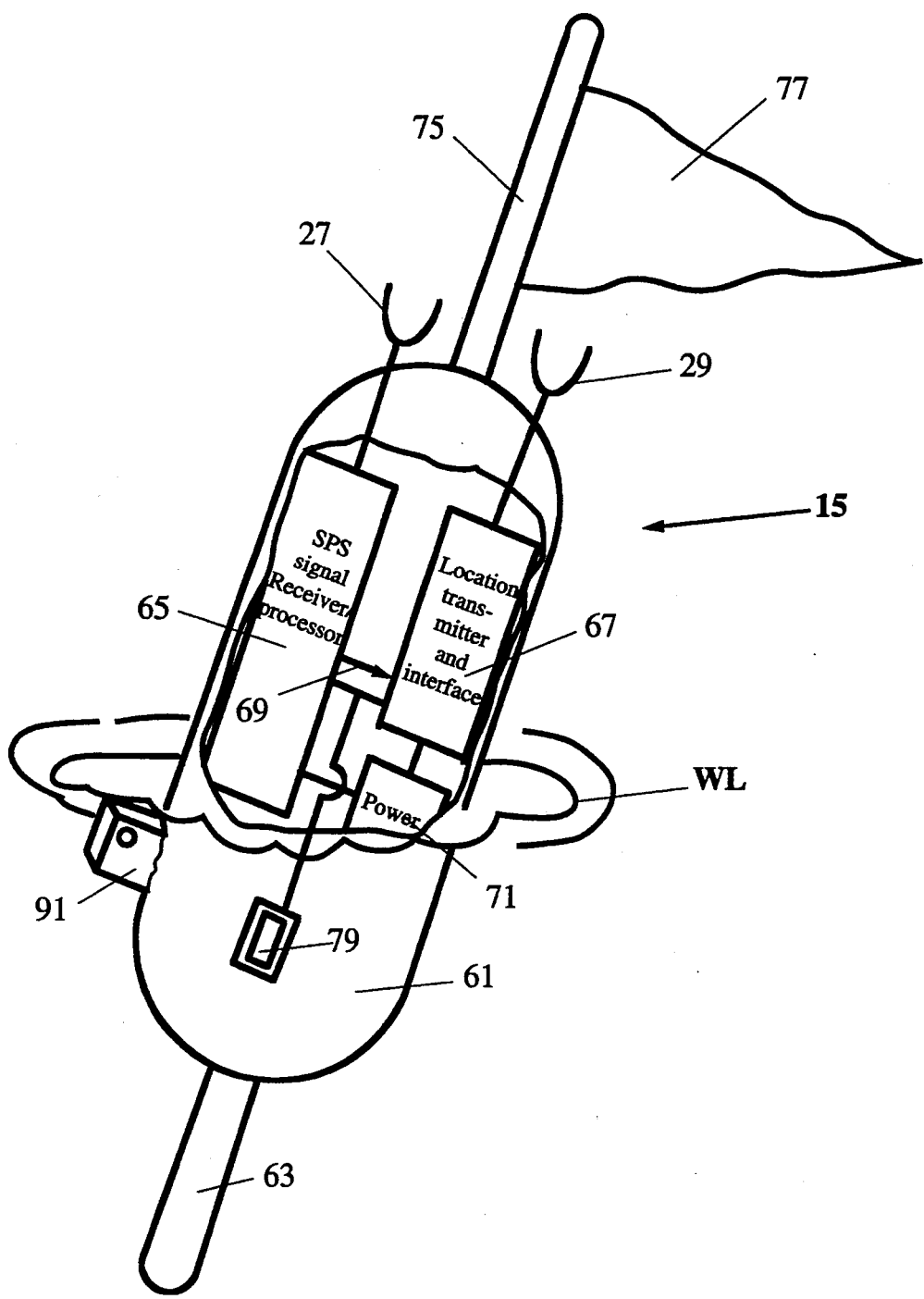

As a further aid, the MOP used in FIG. 5 could include a simple chemical analyzer 91 that receives and analyzes the local concentration of a specified chemical (e.g., the spilled chemical) and provides this local concentration information to the location transmitter 67 for broadcast, as illustrated in the schematic cutaway view of a modified MOP 15' in FIG. 6. A receiver R (FIG. 5) that receives the radio signals transmitted by the location transmitter 67 could then also determine the local concentration of the chemical and thus evaluate whether each MOP is presently located at an approximate boundary point or interface between the target chemical and the ambient water or other liquid.

The MOP 15 or 15' can also be used to perform water current studies or other related studies of periodic or transitory movements of large bodies of water, such as oceans, seas, rivers and lakes. A plurality of MOPs, each with a location transmitter that broadcasts a distinguishable radio signal, would be placed in a suitable pattern in the body of water. These radio signals would then be sequentially received and stored and/or analyzed, to provide a real time or post-processed analysis and display of the movement of that water body, as indicated by movement of the MOPs.

One or a plurality of MOPs can be attached to or placed adjacent to a fishing net that is placed in a body of water and is returned to at a later time. The SPS receiver/processor and location transmitter on any MOP could be activated at the time the MOP is deposited, or these MOP instruments could be activated remotely before the net and its contents are retrieved. After deposit of the fishing net and the adjacent MOP, the net and the MOP can be allowed to drift together, with little likelihood of loss of the net through inability to determine its present location.

A Satellite Positioning System (SPS) is a system of satellite signal transmitters, with receivers located on the Earth's surface or adjacent to the Earth's surface, that transmits information from which an observer's present location and/or the time of observation can be determined. Two operational systems, each of which qualifies as an SPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1 = 1575.42$ MHz and an L2 signal having a frequency $f2 = 1227.6$ MHz. These two frequencies are integral multiples $f1 = 1500 \, f0$ and $f2 = 1200 \, f0$ of a base frequency $f0 = 1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the C/A-code. The nature of these PRN codes is described below.

One motivation for use of two carder signals L1 and L2 is to allow partial compensation for propagation delay of such a signal through the ionosphere, which delay varies approximately as the inverse square of signal frequency f (delay $af^{-2}$). This phenomenon is discussed by MacDoran in U.S. Pat. No. 4,463,357, which discussion is incorporated by reference herein. When transit time delay through the ionosphere is determined, a phase delay associated with a given carder signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, finegrained code having an associated clock or chip rate of $10 \, f0 = 10.23$ MHz. A second PRN code for each GPS satellite, sometimes referred to as a clear/acquisition code or C/A-code, is intended to facilitate rapid satellite signal acquisition and hand-over to the P-code and is a relatively short, coarsergrained code having a clock or chip rate of $f0 = 1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *Guide To GPS Positioning,* edited by David Wells, Canadian GPS Associates, 1986.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1 = (1.602 + 9k/16)$ GHz and $f2 = (1.246 + 7k/16)$ GHz, where k ($=0, 1, 2, \ldots, 23$) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used to provide location coordinates and distances that are accurate to within a meter.

In differential position determination, many of the errors in the SPS that compromise the accuracy of absolute position determination are similar in magnitude for stations that are physically close. The effect of these errors on the accuracy of differential position determination is therefore substantially reduced by a process of partial error cancellation.

I claim:

1. Apparatus for determining the approximate location, on the upper surface of a body of water, of a perceived boundary between a target chemical released in the water and the ambient water, the apparatus comprising one or more location-indicating instruments, each of which comprises:
   a free-floating body designed to be placed in and to float in an upright position on the upper surface of a body of water;
   an activatable Satellite Positioning System (SPS) signal antenna and receiver/processor that, when activated, receives SPS signals from two or more SPS satellites and determines the location of the SPS antenna, the SPS receiver/processor and antenna being contained on the free-floating body;
   an activatable location transmitter and transmitter interface that, when activated, continually receives from the SPS receiver/processor a location signal representing the SPS-determined location of the SPS antenna and transmits this location signal at a selected frequency, with the transmitter and transmitter interface being contained on the free-floating body;
   activation means for activating the SPS receiver/processor and location transmitter; and
   a power supply connected to the SPS antenna, the SPS receiver/processor, the transmitter and the transmitter interface, and the activation means, to provide operating power;
   where each free-floating body is deposited approximately on a perceived boundary between the target chemical released in the water and the surface of the ambient water.

2. The apparatus of claim 1, wherein at least one of said location-indicating instruments further comprises:
   a chemical analyzer, positioned on said free-floating body to be in contact with a liquid in which said body floats, that determines and issues an output signal representing the local concentration of said target chemical in this liquid, wherein said transmitter interface also receives the chemical analyzer output signal and causes said location transmitter to transmit this chemical analyzer signal at a selected transmitter frequency.

3. The apparatus of claim 1, wherein said activation means includes an immersion switch that is contained on said free-floating body and is electronically activated by immersion in water.

4. The apparatus of claim 1, wherein said activation means comprises:
   an activation signal transmitter and associated power supply that transmits an SPS receiver/processor activation signal and is located on a structure near where a person or object has fallen into the water; and
   an activation signal receiver, contained on said floatable object, to receive the SPS receiver/processor activation signal and to activate said SPS receiver/processor and said location transmitter in response to receipt of this activation signal.

5. The apparatus of claim 1, wherein said activation means includes a manually operable switch that, when switched to an active state, activates said SPS receiver/processor and said location transmitter, this switch being contained on said free-floating body.

6. The apparatus of claim 1, further comprising a visually perceptible flag, visually perceptible light or other visually perceptible indicia attached to said floatable object so that, when said free-floating body floats in an upright position in the water, at least a portion of the flag, light or other indicia is visible above the upper surface of the water.

7. The apparatus of claim 1, further comprising a drogue attached to said free-floating body and unfurled in the water to encourage said free-floating body to move at approximately the same velocity and in approximately the same direction as the local water current.

8. A method for determining the approximate location, on the upper surface of a body of water, of a target chemical in the water, the method comprising the steps of:
   providing one or more free-floating bodies designed to be placed in and to float in an upright position on the upper surface of a body of water, with each flee-floating body containing or being attached to:
   an activatable Satellite Positioning System (SPS) signal antenna and receiver/processor that, when activated, receives SPS signals from two or more SPS satellites and determines the location of the SPS antenna, the SPS receiver/processor and antenna being contained on the flee-floating body;
   an activatable location transmitter and transmitter interface that, when activated, continually receives from the SPS receiver/processor a location signal representing the SPS-determined location of the SPS antenna and transmits this location signal at a selected frequency, with the transmitter and transmitter interface being contained on the flee-floating body;
   activation means for activating the SPS receiver/processor and location transmitter; and
   a power supply connected to at least one of the SPS antenna, the SPS receiver/processor, the transmitter, the transmitter interface and the activation means, to provide operating power; and
   positioning the flee-floating body or bodies in a selected pattern in the water approximately on a perceived boundary between the target chemical released in the water and the surface of the ambient water.

9. The method of claim 8, further comprising the step of activating said SPS receiver/processor and location transmitter at the time said flee-floating body is positioned in the water.

10. The method of claim 8, further comprising the step of attaching a visually perceptible flag, visually perceptible light or other visually perceptible indicia to said free-floating body so that, when said free-floating body floats in an upright position in the water, at least a portion of the flag, light or other indicia is visible above the upper surface of the water.

11. The method of claim 8, further comprising the step of attaching a drogue to said free-floating body and unfurling the drogue in the water to encourage said free-floating body to move at approximately the same velocity and in approximately the same direction as the local water current.

12. The method of claim 8, further comprising the step of positioning a chemical analyzer on said free-floating body to be in contact with a liquid in which said free-floating body floats, that determines and issues an output signal representing the local concentration of said target chemical in this liquid, wherein said transmitter interface also receives the chemical analyzer output signal and causes said location transmitter to transmit this chemical analyzer signal at a selected transmitter frequency.

13. The apparatus of claim 7, wherein said free-floating body is not appreciably affected by local wind currents.

14. Apparatus for determining the approximate location, on the upper surface of a body of water, of a person or other object that has fallen into the water, the apparatus comprising:
  a flee-floating body designed to be placed in and to float in an upright position on the upper surface of a body of water;
  an activatable Satellite Positioning System (SPS) signal antenna and receiver/processor that, when activated, receives SPS signals from two or more SPS satellites and determines the location of the SPS antenna, with the SPS receiver/processor and antenna being contained on the flee-floating body;
  an activatable location transmitter and transmitter interface that, when activated, continually receives from the SPS receiver/processor a location signal representing the SPS-determined location of the SPS antenna and transmits this location signal at a selected frequency, the transmitter and transmitter interface being contained on the flee-floating body;
  an activation device, attached to the flee-floating body, for activating at least one of the SPS receiver/processor and location transmitter when the fleefloating body is at least partly immersed in water, the activation device comprising an immersion switch, which is activated by immersion of the switch in water and which transmits a signal that activates the location transmitter, transmitter interface and SPS receiver/processor to cause the transmitter to transmit a selected signal that includes the present location of the SPS antenna; and
  a power supply connected to at least one of the SPS antenna, the SPS receiver/processor, the transmitter, the transmitter interface and the activation device, to provide operating power,
  where the free-floating body is designed to be placed in the water adjacent to, but separate from, a person or other object that has fallen into the water.

15. The apparatus of claim 14, further comprising a manually operable switch that, when switched to an active state, activates at least one of said SPS receiver/processor and said location transmitter, this switch being contained in or on said free-floating body or on a structure near said free-floating body.

16. The apparatus of claim 14, further comprising a visually perceptible flag, visually perceptible light or other visually perceptible indicia attached to said free-floating body so that, when said free-floating body floats in an upright position in the water, at least a portion of the flag, light or other indicia is visible above the upper surface of the water.

17. The apparatus of claim 14, further comprising a drogue attached to said free-floating body and unfurled in the water to encourage said free-floating body to move at approximately the same velocity and in approximately the same direction as the local water current.

* * * * *